(12) United States Patent
Munaux et al.

(10) Patent No.: US 8,052,819 B2
(45) Date of Patent: Nov. 8, 2011

(54) METHOD AND MACHINE FOR APPLYING A BAND OF FIBERS ON CONVEX SURFACES AND/OR WITH EDGES

(75) Inventors: Olivier Munaux, Guidel (FR); Hervé Cappelle, Larmor Plage (FR); Alexander Hamlyn, Ploemeur (FR)

(73) Assignee: Coriolis Composites, Lyons (FR)

( * ) Notice: Subject to any disclaimer, the term of this patent is extended or adjusted under 35 U.S.C. 154(b) by 5 days.

(21) Appl. No.: 12/434,253

(22) Filed: May 1, 2009

(65) Prior Publication Data
US 2010/0252183 A1 Oct. 7, 2010

(30) Foreign Application Priority Data
Apr. 2, 2009 (FR) ...................................... 09 52144

(51) Int. Cl.
*B65H 81/00* (2006.01)
(52) U.S. Cl. ........ 156/169; 156/173; 156/175; 156/189; 156/195; 156/425; 156/433; 156/441; 156/523; 156/573
(58) Field of Classification Search .................. 156/173, 156/175, 169, 433, 441, 425
See application file for complete search history.

(56) References Cited

U.S. PATENT DOCUMENTS

| | | | |
|---|---|---|---|
| 494,910 A | 4/1893 | Wells | |
| 1,100,829 A | 6/1914 | Joseph | |
| 1,164,303 A | 12/1915 | Nicewarner | |
| 1,301,354 A | 4/1919 | Baird | |
| 3,206,429 A | 9/1965 | Broyles et al. | |
| 3,238,084 A | 3/1966 | Hawkins | |
| 3,265,795 A | 8/1966 | Medney | |
| 3,300,355 A | 1/1967 | Adams | |
| 3,563,122 A | 2/1971 | De Neui | |
| 3,662,821 A | 5/1972 | Saxon | |
| 3,713,572 A | 1/1973 | Goldsworthy et al. | |
| 3,856,052 A | 12/1974 | Feucht | |
| 4,118,814 A | 10/1978 | Holtom | |
| 4,242,160 A | 12/1980 | Pinter et al. | |
| 4,351,688 A | 9/1982 | Weiss et al. | |
| 4,461,669 A * | 7/1984 | Dontscheff | .................... 156/574 |

(Continued)

FOREIGN PATENT DOCUMENTS
DE 1 922 327 U 8/1965
(Continued)

OTHER PUBLICATIONS

Machine English Translation for JP 2005329593, Feb. 15, 2005.*
(Continued)

*Primary Examiner* — Jeff Aftergut
(74) *Attorney, Agent, or Firm* — Patterson Thuente Christensen Pedersen, P.A.

(57) ABSTRACT

Embodiments of the invention relate to a fiber application method and a fiber application machine for producing parts in composite material, such as for the application of a band of fibers on convex surfaces and/or with edges. The machine comprises a fiber application head and a moving system for moving the application head. The application head comprises a compacting system including a compacting roller intended to come in contact against the application surface to apply the band, and a compacting member placed downstream from the compacting roller and exhibiting a substantially planar contact surface, said compacting member being capable of being pressed by its contact surface, against an application surface, substantially on the entire width of a band, by at least one contact line.

9 Claims, 5 Drawing Sheets

U.S. PATENT DOCUMENTS

| | | | |
|---|---|---|---|
| 4,488,466 A | 12/1984 | Jones | |
| 4,562,033 A | 12/1985 | Johnson et al. | |
| 4,569,716 A | 2/1986 | Pugh | |
| 4,574,029 A | 3/1986 | Murray | |
| 4,699,031 A | 10/1987 | D'Angelo et al. | |
| 4,717,330 A | 1/1988 | Sarh | |
| 4,735,672 A | 4/1988 | Blad | |
| 4,849,150 A | 7/1989 | Kittaka et al. | |
| 4,976,012 A | 12/1990 | McConnell | |
| 4,990,213 A * | 2/1991 | Brown et al. | 156/425 |
| 4,992,133 A | 2/1991 | Border | |
| 4,997,513 A | 3/1991 | Lengen et al. | |
| 5,078,592 A | 1/1992 | Grimshaw et al. | |
| 5,087,187 A | 2/1992 | Simkulak et al. | |
| 5,110,395 A | 5/1992 | Vaniglia | |
| 5,290,389 A | 3/1994 | Shupe et al. | |
| 5,447,586 A * | 9/1995 | Tam | 156/175 |
| 5,700,347 A * | 12/1997 | McCowin | 156/425 |
| 6,026,883 A | 2/2000 | Hegerhorst et al. | |
| 6,073,670 A | 6/2000 | Koury | |
| 6,251,185 B1 | 6/2001 | Morrison et al. | |
| 6,256,889 B1 | 7/2001 | Zuro | |
| 6,451,152 B1 | 9/2002 | Holmes et al. | |
| 6,458,309 B1 | 10/2002 | Allen et al. | |
| 6,490,990 B1 | 12/2002 | Hamlyn et al. | |
| 6,540,000 B1 | 4/2003 | Darrieux et al. | |
| 6,605,171 B1 | 8/2003 | Debalme et al. | |
| 7,048,024 B2 | 5/2006 | Clark et al. | |
| 7,819,160 B2 | 10/2010 | Hamlyn et al. | |
| 7,926,537 B2 | 4/2011 | Hamlyn et al. | |
| 2002/0014715 A1 | 2/2002 | Wirth et al. | |
| 2002/0090408 A1 | 7/2002 | Dahl et al. | |
| 2002/0152860 A1 | 10/2002 | Machamer | |
| 2003/0118681 A1 | 6/2003 | Dahl et al. | |
| 2004/0031879 A1 | 2/2004 | Kay et al. | |
| 2004/0079838 A1 * | 4/2004 | Simpson et al. | 244/123 |
| 2004/0103948 A1 | 6/2004 | Scheelen et al. | |
| 2005/0023414 A1 | 2/2005 | Braun | |
| 2005/0037195 A1 | 2/2005 | Warek | |
| 2005/0039844 A1 | 2/2005 | Engwall et al. | |
| 2005/0061422 A1 | 3/2005 | Martin | |
| 2005/0236735 A1 * | 10/2005 | Oldani et al. | 264/257 |
| 2006/0162143 A1 | 7/2006 | Nelson et al. | |
| 2006/0169118 A1 | 8/2006 | Morehead | |
| 2006/0180264 A1 | 8/2006 | Kisch et al. | |
| 2006/0231682 A1 | 10/2006 | Sarh | |
| 2007/0044919 A1 | 3/2007 | Hoffmann | |
| 2007/0044922 A1 | 3/2007 | Mischler et al. | |
| 2008/0093026 A1 | 4/2008 | Naumann | |
| 2008/0105785 A1 | 5/2008 | Griess et al. | |
| 2008/0157437 A1 | 7/2008 | Nelson et al. | |
| 2008/0196825 A1 | 8/2008 | Hamlyn | |
| 2008/0202691 A1 | 8/2008 | Hamlyn et al. | |
| 2008/0216961 A1 | 9/2008 | Hamlyn et al. | |
| 2008/0216963 A1 | 9/2008 | Hamlyn et al. | |
| 2009/0229760 A1 | 9/2009 | Hamlyn et al. | |
| 2009/0311506 A1 | 12/2009 | Herbeck et al. | |
| 2011/0011537 A1 | 1/2011 | Hamlyn et al. | |
| 2011/0011538 A1 | 1/2011 | Hamlyn et al. | |

FOREIGN PATENT DOCUMENTS

| | | |
|---|---|---|
| DE | 37 43 485 A1 | 7/1989 |
| DE | 10 2007 009 124 A1 | 8/2008 |
| EP | 0 216 695 A1 | 4/1987 |
| EP | 0 241 251 A1 | 10/1987 |
| EP | 0 557 158 A1 | 8/1993 |
| EP | 0 753 394 A2 | 1/1997 |
| EP | 0 773 099 A1 | 5/1997 |
| EP | 0 626 252 B1 | 11/1999 |
| EP | 1 001 066 A2 | 5/2000 |
| EP | 1 177 871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 A1 | 6/1989 |
| FR | 2 686 080 A1 | 7/1993 |
| FR | 2 721 548 A1 | 12/1995 |
| FR | 2 784 930 A1 | 4/2000 |
| FR | 2 865 156 A1 | 7/2005 |
| FR | 2 882 681 A1 | 9/2006 |
| FR | 2 913 365 | 9/2008 |
| GB | 2 268 705 A | 1/1994 |
| GB | 2 270 672 A | 3/1994 |
| GB | 2 292 365 A | 2/1996 |
| JP | 01281247 | 11/1989 |
| JP | 2005-007252 | 1/2005 |
| JP | 2005329593 | 2/2005 |
| WO | WO 95/20104 | 7/1995 |
| WO | WO 02/070232 A1 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO 2008/149004 A1 | 12/2008 |
| WO | WO 2010/049424 A1 | 5/2010 |

OTHER PUBLICATIONS

File History for U.S. Appl. No. 11/666,537, filed Nov. 26, 2008.
File History for U.S. Appl. No. 11/740,055, filed Apr. 25, 2007.
File History for U.S. Appl. No. 11/740,057, filed Apr. 25, 2007.
File History for U.S. Appl. No. 11/740,060, filed Apr. 25, 2007.
File History for U.S. Appl. No. 11/740,064, filed Apr. 25, 2007.
Transaction History for U.S. Patent No. 6,490,990 Issued Dec. 10, 2002.
French Search Report dated Apr. 13, 2010 for French Application No. 09 54963.
French Search Report dated Apr. 15, 2010 for French Application No. 09 54964.
File History for U.S. Appl. No. 12/628,449, filed Dec. 1, 2009.
File History for U.S. Appl. No. 12/628,460, filed Dec. 1, 2009.
Application and File History for U.S. Publication No. 2009/0229760 published Sep. 17, 2009, inventor Hamlyn.
Application and File History for U.S. Publication No. 2008/0202691 published Aug. 28, 2008, inventor Hamlyn.
Application and File History for U.S. Publication No. 2008/0196825 published Aug. 21, 2008, inventor Hamlyn.
Application and File History for U.S. Publication No. 2008/0216961 published Sep. 11, 2008, inventor Hamlyn.
Application and File History for U.S. Publication No. 2008/0216963 published Sep. 11, 2008, inventor Hamlyn.
Application and File History for U.S. Appl. No. 12/628,449, filed Dec. 1, 2009, inventor Hamlyn.
Application and File History for U.S. Appl. No. 12/628,460, filed Dec. 1, 2009, inventor Hamlyn.
International Search Report for International Application No. PCT/EP2010/054377 dated Jul. 2, 2010.
Application and File History for U.S. Appl. No. 11/666,537, filed Nov. 26, 2008, inventor Hamlyn.
Application and File History for U.S. Appl. No. 11/740,055, filed Apr. 25, 2007, inventor Hamlyn.
Application and File History for U.S. Appl. No. 11/740,057, filed Apr. 25, 2007, inventor Hamlyn.
Application and File History for U.S. Appl. No. 11/740,060, filed Apr. 25, 2007, inventor Hamlyn.
Application and File History for U.S. Appl. No. 11/740,064, filed Apr. 25, 2007, inventor Hamlyn.
Application and File History for U.S. Appl. No. 12/628,460, filed on Dec. 1, 2009, inventor Hamlyn.
Non-Final Office Action from U.S. Appl. No. 12/628,460 dated Jul. 18, 2011.

* cited by examiner

METHOD AND MACHINE FOR APPLYING A BAND OF FIBERS ON CONVEX SURFACES AND/OR WITH EDGES

RELATED APPLICATIONS

The present application claims priority to French Application No. 09 52144 filed Apr. 2, 2009, which is incorporated by reference herein in its entirety.

TECHNICAL FIELD

The present invention relates to a fiber application method and a fiber application machine for producing composite material parts, more particularly to a method and a machine for the application of a band of fibers on convex surfaces and/or surfaces with edges.

BACKGROUND

There have been known fiber application machines, so-called fiber placement machines, for applying on a male or female mold a wide band formed by several flat ribbon-type fibers, impregnated with a resin, particularly carbon fibers impregnated with a thermosetting or thermoplastic resin. These machines, such as described in patent document WO2006/092514, typically comprise a fiber application head, capable of applying on a mold application surface a band formed of several flat fibers, and a moving system for moving said fiber application head.

The fiber application head, also called a fiber placement head, typically comprises a compacting roller intended to come in contact with the mold along a contact line for applying the band of fibers, and fiber guiding means for guiding fibers in the form of a band on said compacting roller.

The moving system ensures the movement of the application head along at least three directions perpendicular to each other. The moving system may be formed by a standard six-axis robot-type polyarticulated arm, placed on the ground or mounted on a linear axis, with an end wrist joint to which the application head is fixed, or by a portal-frame type cartesian-coordinate robot equipped with an end wrist joint carrying the application head.

During the application or the deposit of the fibers by the compacting roller, the latter maintains a continuous pressure on the application surface of the mold to progressively evacuate the air trapped between the deposited bands of fibers. Following the application of several layers of superposed bands, the resulting part is vacuum-hardened by passing through an oven, generally a autoclave oven.

This compacting operation during the deposit makes it possible to obtain a part before the hardening operation, the dimensions of which substantially correspond to those of the final part obtained after hardening.

In the case of the application of the band formed of a large number of fibers, for example, of eight fibers, application machines and programming software for fiber placement currently proposed do not make it possible to deposit a band of fibers on edges or convex surfaces with a low radius of curvature, for example less than 10 mm, while compacting all the band fibers, and with orientations of about 45° or 135° with respect to the edge or the generatrix line of the convex surface.

In the absence of compacting, the evacuation of air bubbles is only carried out during the vacuum hardening, and the final part thus exhibits folds of surplus material at said edges or convex surfaces.

To date, these different parts with edges and/or convex surfaces are obtained by producing plane parts by means of an application machine of the aforementioned type, then by a folding and/or bending operation of the plane parts before hardening. Apart from the fact that this folding or bending step requires an additional complex operation, it also leads to the formation of folds at the internal layers, which affects the resistance properties of the final part.

As a result, the application machines proposed to date are not used for essential parts, particularly in the aeronautics sector, such as the spars of an airplane wing, beams of wind turbine blades, aerodynamic profiles, so called L-shaped fittings or reinforcements.

SUMMARY

An object of the present invention is to propose a solution aiming to overcome the aforementioned drawbacks, making it possible to produce, by means of a fiber application machine, parts with edges and/or convex surfaces with good mechanical properties.

To this end, the present invention proposes a method for applying a band formed of several flat fibers, substantially adjoining, on an application surface comprising a first substantially planar surface and a second substantially planar surface connected by an edge or by a rounded surface, for example arc-shaped, or on a convex application surface, for example a cylindrical or tapered surface, the application of the band being made by a fiber application head that comprises a compacting system including a compacting roller, said method comprising applying the compacting roller against the application surface and the movement of the compacting head to apply a band of fibers on the application surface, the method comprising: applying, against the band of fibers applied on the application surface, a compacting member of the compacting system, placed downstream of the compacting roller with respect to the direction of progress of the head, the compacting member being substantially in contact against all the fibers of the band by at least one contact line, and pivoting the head around the edge, around the rounded surface or around the convex surface, such that the compacting member remains in contact with the band to compact the band, by at least one contact line, substantially without sliding between the compacting member and the application surface, the compacting roller describing an involute curve.

According to an embodiment of the invention, the head comprises an additional compacting member whereby it is put in contact against the band applied against the application surface, by at least one contact line, then the head is pivoted such as to maintain the compacting member against the band by at least one contact line, while keeping a substantially null translation relative speed between the compacting member and the application surface, i.e., substantially without sliding.

The contact of the compacting member is carried out by rocking the head backwards, via the head moving system and/or by moving the compacting member by a moving system of its own. The pivoting step is carried out after moving the head tangentially to the application surface to bring the compacting roller beyond the edge, beyond the junction line between the first surface and the rounded surface, or beyond the generatrix line of the convex surface, in order to make the pivoting operation possible, the pressing step of the compacting member being carried out simultaneously or after this moving step.

According to an embodiment, in the case of an application surface comprising a first substantially planar surface and a second substantially planar surface connected by a edge, the method comprises applying the compacting roller against the first surface by at least one contact line, and moving the application head to apply a band of fibers on the first surface, in a first direction forming with the edge an angle $\alpha1$, on the nearing of the edge, moving the head in the first direction, tangentially to the first surface, to bring the compacting roller substantially beyond the edge, and simultaneously or successively, contacting the compacting member against the band applied on the first surface, pivoting the head around the edge, such that the compacting member remains in contact with the band by at least one contact line, the pivoting being carried out until the contacting of the compacting roller against the second surface by at least one contact line substantially corresponding to the band width, spacing apart the compacting member from the application surface so that it is no longer in contact therewith, and simultaneously or successively, moving the head to apply the band on the second surface, in a second direction forming with the edge an angle $\alpha2$ substantially equal to $180-\alpha1$.

According to another embodiment, in the case of an application surface comprising a first substantially planar surface and a second substantially planar surface connected by a rounded surface, the method comprises applying the compacting roller against the first surface by at least one contact line and moving the application head to apply a band of fibers on the first surface, in a first direction forming an angle $\alpha1$ with the substantially linear first junction line between the first surface and the rounded surface, on the nearing of the first junction line, moving the head in the first direction, tangentially to the first surface, to bring the compacting roller beyond the first junction line, and simultaneously or successively contacting the compacting member against the band applied on the first surface, pivoting, in one or several pivoting steps, the head around the rounded surface, such that the member remains in contact with the band by at least one contact line, until the contacting of the compacting roller against the second surface by at least one contact line, and spacing apart the compacting member from the application surface so that it is no longer in contact therewith, and simultaneously or successively, moving the application head in contact with the second surface by its compacting roller by at least one contact line to apply the band on the second surface, in a direction forming an angle $\alpha2$, substantially equal to $180-\alpha1$, with the second junction line between the rounded surface and the second surface.

In this embodiment, after putting in contact the compacting member against the band applied on the first surface, it is possible to pivot the head around the rounded surface until contacting the compacting roller against the application surface, and, if the compacting roller is in contact on at least one contact point with the rounded surface at the end of the pivoting, move the head tangentially to the rounded surface to said contact point, in a direction forming an angle al with the generatrix line of the rounded surface passing by the contact point, with or without contacting the compacting member with the rounded surface, preferably without contact by spacing apart the member from the rounded surface in an embodiment, then pivot the head around the rounded surface, these two moving and pivoting steps being reiterated until contacting the compacting roller against the second surface by at least one contact line.

Alternatively, the moving of the head preceding the pivoting step is carried out before contacting the roller against the rounded surface.

The rounded surface may extend over an angular sector higher than 180°.

According to another embodiment, in the case of a convex application surface, for example a cylindrical or tapered surface, the method comprises applying the compacting roller against the convex application surface by at least one contact point, moving the head tangentially to the convex application surface to the contact point, in a direction forming an angle $\alpha1$ with the generatrix line of the convex surface passing by the contact point, with or without contacting the compacting member with the convex application surface, and in one or more pivoting steps, pivoting around the convex application surface the application head pressed against the convex application surface by its compacting member, the pivoting being carried out such that the member remains in contact with the band by at least one contact line.

In this embodiment, after moving the head tangentially to the convex application surface to the contact point, in a direction forming an angle $\alpha1$ with the generatrix line of the convex surface passing by the contact point, with or without contact of the compacting member with the convex application surface, preferably without contact by spacing apart said member from the convex application surface in an embodiment, it is possible to pivot around the convex application surface, the application head pressed against the convex application surface by its compacting member, until contacting the compacting roller against the convex application surface, and reiterate the previous moving and pivoting steps one or more times.

Alternatively, the moving of the head preceding the pivoting step is carried out before contacting the roller against the convex application surface.

The method is advantageously used for an angle $\alpha1$ different from 90°, preferably comprised between 10° and 80° in an embodiment, preferably between 20 and 70° in another embodiment, more preferably between 30 and 60° in another embodiment, for example around 45° in an embodiment.

An object of the present invention is also a fiber application machine, for producing parts in composite materials, that could be used for the implementation of the method defined above, comprising: a fiber application head, able to apply on an application surface a band formed of several flat fibers, and that comprises a compacting system including a compacting roller intended to come in contact with the application surface to apply the band, and fiber guiding means for guiding fibers, in the form of a band, on the compacting roller, and a moving system for moving the fiber application head, wherein said compacting system further comprises a compacting member placed downstream of said compacting roller and exhibiting a substantially planar contact surface, the compacting member being able to be pressed by its contact surface, against an application surface, on substantially the whole width of a band, by at least one contact line.

The compacting member is advantageously made of an elastomeric material, preferably coated with an anti-adherent film in an embodiment, such as a Teflon film. The contact surface of the compacting member is advantageously placed nearest to the compacting roller.

According to an embodiment, the compacting member comprises a compacting wedge, separate from the compacting roller.

According to another embodiment, the compacting member comprises an endless band mounted on an upstream return roller and a downstream return roller, both rollers being mounted, preferably rotatably mounted in an embodiment, downstream of the compacting roller, parallely to the axis of the compacting roller, the lower strand of the endless band constituting the contact surface of the compacting member.

According to another embodiment, the compacting member comprises an endless band mounted on the compacting roller and a downstream return roller, the downstream return roller being mounted downstream and parallel to the compacting roller, the lower strand of the endless strand constituting the contact surface of the contacting member.

According to an embodiment, the application head comprises a support structure whereby the head is coupled to the moving system, the compacting member and the compacting roller are fixedly mounted with respect to each other on the support structure, without relative movement of the contact surface of the compacting member with respect to the axis of the compacting roller, the compacting member is thus pressed against an application surface by movement of the application head by the machine moving system. Alternatively, the compacting member is mounted on the support structure, in a removable manner, moving means being capable of moving said compacting member between a retracted position and one or several active positions, by a rotation and/or translation movement, to bring the compacting against the application surface.

BRIEF DESCRIPTION OF THE DRAWINGS

The invention will be better understood, and other objects, details, characteristics and advantages will become more apparent in the following detailed explanatory description of currently-preferred particular embodiments of the invention, with reference to the accompanying schematic drawings, wherein.

DETAILED DESCRIPTION

Figure 1:
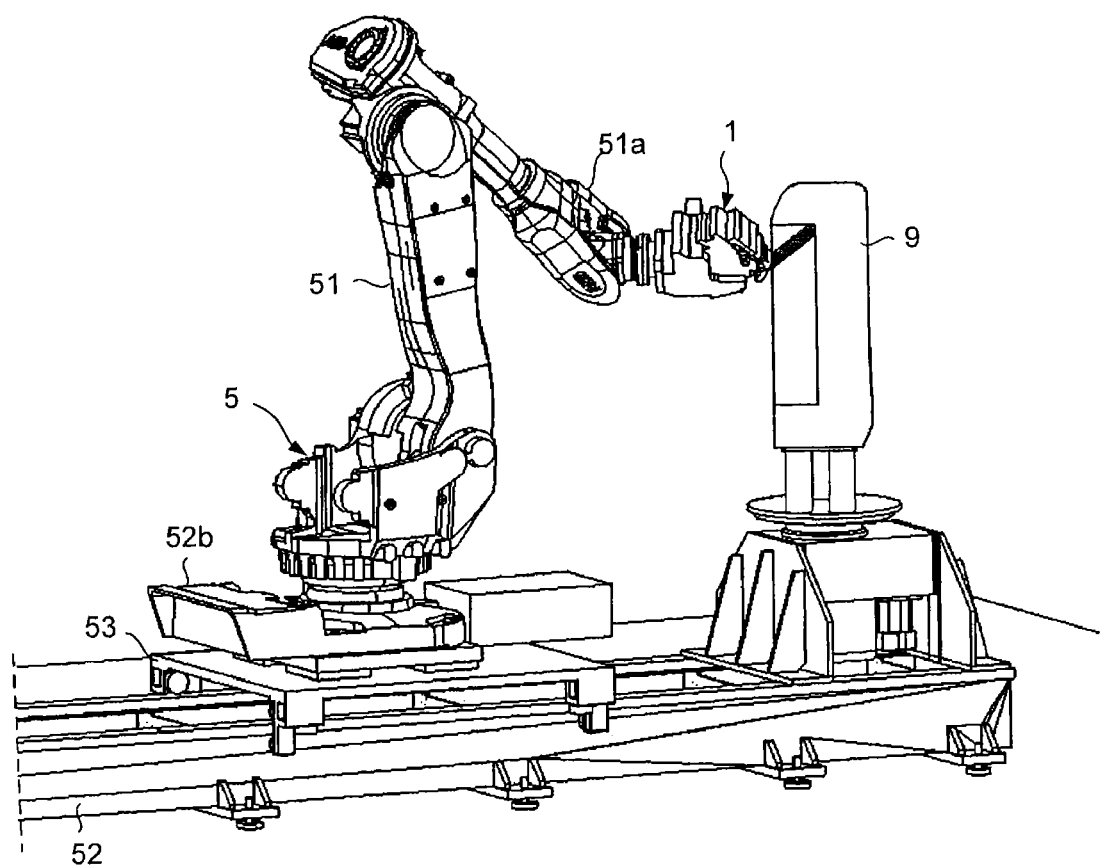
FIG. 1 is a schematic perspective view of an application machine according to a first embodiment applying a band of fibers on the application surface of a mold.

With reference to FIG. 1, the fiber application machine comprises a fiber application head 1 and a moving system 5 to move the fiber application head in all directions. Herein, the moving system comprises a six-axis robot-type polyarticulated arm 51, known per se, mounted movable on a linear axis 52, and whereof the end wrist joint 511 is equipped with the application head 1. The polyarticulated arm is fixed by its sub-plate 52b on a carriage 53 slidably mounted on the linear axis 52, said linear axis being constituted of two parallel rails fixed to the ground. The carriage is equipped with drive means, for example of a motor powered roll-type, servo-controlled by a controller for moving the application head along these rails. The fiber application machine further comprises fiber-storage means and conveying means (not shown) to convey the fibers from the storage means towards the application head. The fibers will be advantageously bobbin-stored on a creel, mounted for example on a sliding follower carriage on the axis 52, and individually conveyed to the application head via flexible conveying tubes, such as described in patent document WO 2006/092514.

Figure 2:
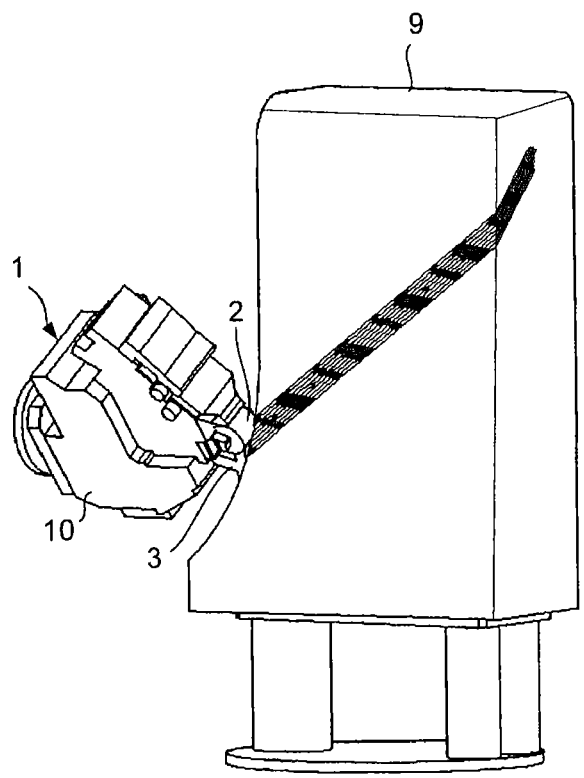
FIG. 2 is an enlarged schematic perspective view of the application head of the machine of FIG. 1, applying a band of fibers on the mold.
Figure 3:
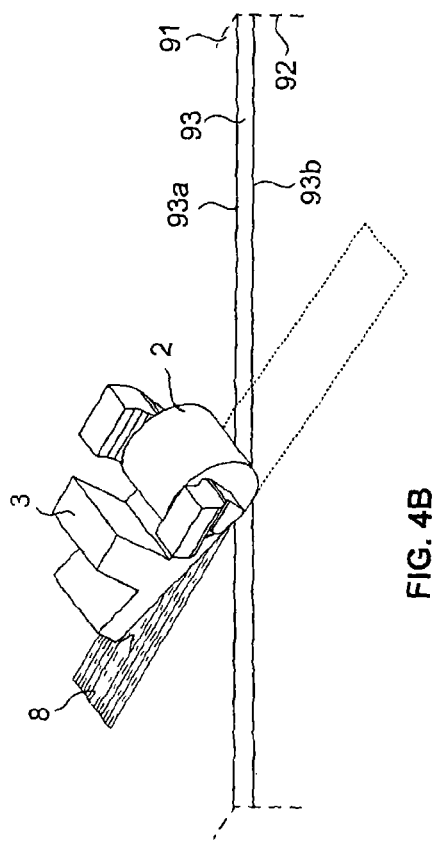
FIGS. 3 and 4A are two schematic perspective views of the compacting system of the head of FIG. 2 applying a band of fibers on an application surface of the mold comprising a first substantially planar surface and a second substantially planar surface substantially placed at 90° from each other and connected by a rounded arc-shaped surface, the application head being in the process of applying the band on the first surface.

With reference to FIGS. 2 and 3, the fiber application head comprises a support structure 10, whereby the head is mounted at the end of the wrist joint of the robot, and whereon are mounted fiber-guiding means and a compacting system comprising a compacting roller 2. The guiding means guide the fibers entering the head towards the compacting roller in the form of a band of resin-preimpregnated fibers, the fibers of the band being substantially adjoinably placed side by side. By moving the head by the robot, the compacting roller, known per se, is capable of being brought in contact with the application surface of a mold 9 to apply the band formed of several fibers. The head is, for example, a head of the type described in patent document FR 2 913 365. Said compacting roller 2 is rotatably mounted on the support structure 10, in a removable manner, via lateral supports 21. The roller comprises an elastomeric material coated with an anti adhesive material, for example Teflon. The width of the roller is slightly higher than the width of the band that is formed of eight fibers in the illustrated embodiment.

The compacting system further comprises a compacting member which, in this embodiment, is formed of a compacting wedge 3 placed downstream from said compacting roller with respect to the direction of progress of the head, represented by the arrow referenced F1 on FIG. 3, for the application of a band of fibers on an application surface. According to FIG. 3, the compacting wedge is constituted of a block 30, for example substantially parallelepipedonal, the width of which, defined by the distance between the two lateral faces 31 of the block, is substantially equal to the width of the compacting roller 2. The lower face of the block constitutes a substantially planar, so-called contact surface 32, whereby the compacting wedge is intended to abut by at least one contact line on the entire width of the band that has been deposited by the compacting roller.

In an embodiment, the compacting wedge is fixedly mounted on the support structure 10 by a central assembling arm 35, behind the compacting roller, such that its contact surface 32 is tangentially placed at the compacting roller, the contacting of the head against the just placed band of fibers being obtained by rocking the head backwards via the polyarticulated arm 51.

The front face of the block, placed on the side of the roller, advantageously exhibits a concave surface 33 whereof the radius of curvature is adapted to that of the roller to mount the wedge, and particularly its contact surface 32, nearest to the roller. Advantageously, the front edge 34 defined between the concave surface 33 and the contact surface 32 has a height reduced as much as possible, the front edge 34 being also quasi-linear. The guiding means bring the fibers against the compacting roller, the fibers passing between the roller and the compacting wedge, substantially without contact with the compacting wedge. The block is advantageously formed of an elastomeric material analogous to that of the roller, the lower face being advantageously coated with an anti adherent film, for example Teflon film, constituting the contact surface 32.

The head equipped with this compacting system is advantageously used to deposit a band of fibers on an application surface exhibiting an edge or a convex surface to ensure a good compacting of the band at the edge or convex surface, particularly when the applied band forms an angle with the edge or the convex surface, of for example 45° or 135°.

Presently, a description of a method of applying a band by means of the fiber application machine according to an embodiment of the invention on an application surface of a mold will be made with reference to FIGS. 3, 4A to 4G, 5 and 6, in the case of an application surface 90 comprising a first substantially planar surface 91 and a second substantially planar surface 92 connected by an arc-shaped rounded surface 93.

Both surfaces 91 and 92 are placed at 90° from each other, the rounded surface 93 extending in an arc on an angular sector of 90°. References 93a and 93b designate the substantially linear first junction line between the first surface 91 and the rounded surface 93 and the substantially linear second junction line between the second surface and the rounded surface, respectively.

The first and second surfaces are said to be substantially planar. Presently, by "substantially planar surface," it is meant a planar surface as well as the case of a concave or convex surface, whereof the convexity or the concavity is sufficiently low for allowing the pressing of the roller on said surface on its entire width, in order to compact all the fibers of the band, the roller in elastomeric material being able if need be, to slightly deform to ensure this pressing.

Figure 4B:
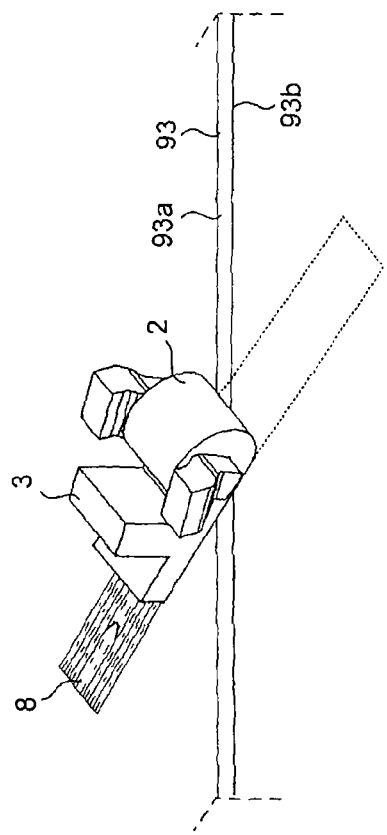
FIGS. 4B to 4G are schematic perspective views analogous to those of FIG. 4A, illustrating different positions of the application head during the application of the band of fibers on the first surface, the rounded surface and the second surface, with an orientation of around 45°.
Figure 4A:
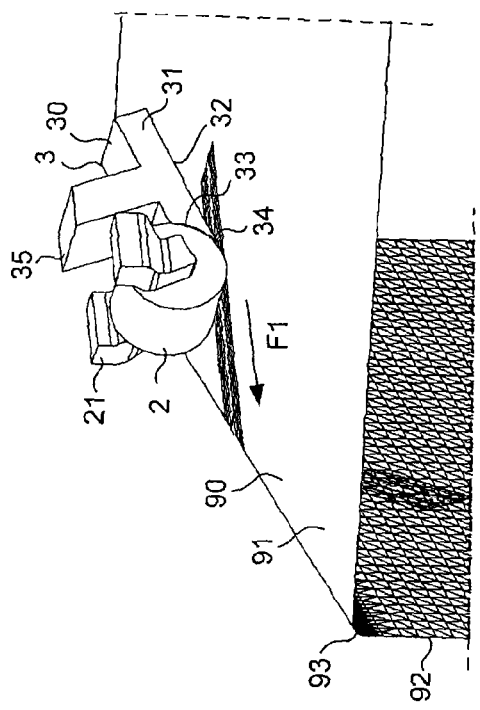
Figure 6:
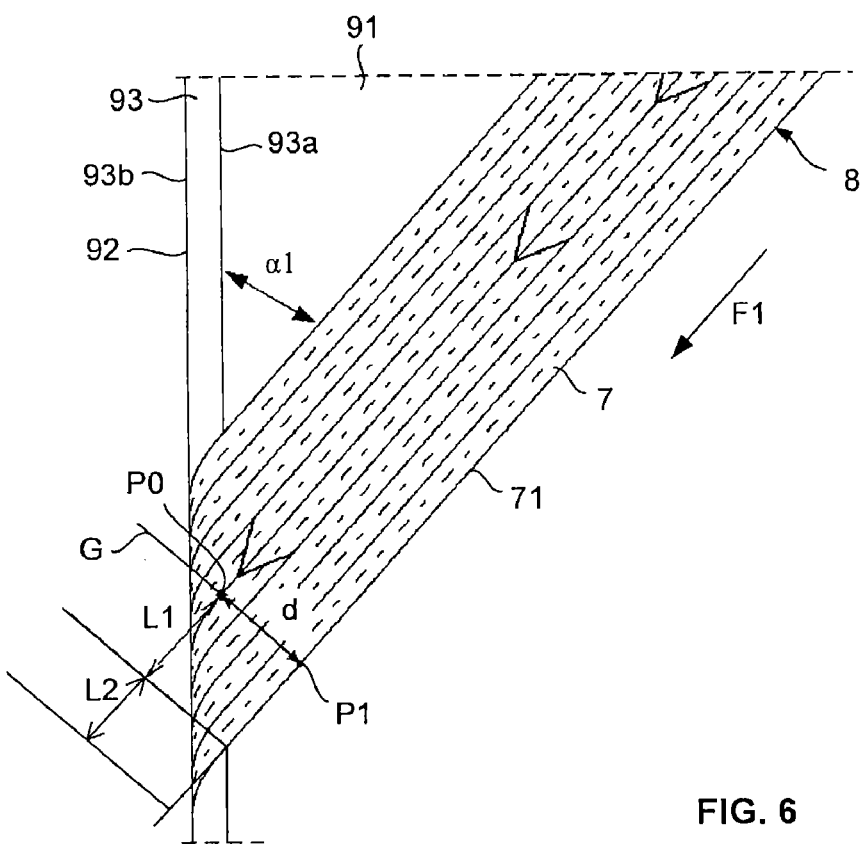
FIG. 6 is a top view of the band of fibers applied on the first surface of the application surface of FIG. 3.

With reference to FIGS. 3, 4A and 6, the application head deposits a band 8 of fibers 7 on the first surface 91. The application head is typically pressed against the first surface 91 by the compacting roller 2, by at least one contact line. In practice, the roller is pressed in deformable material by a narrow band. The head is moved in direction F1 to apply a band forming an angle α1 (FIG. 6) with the first junction line 93a.

The head is moved in the same direction F1, to the first junction line 93a, such as illustrated in FIG. 4B. To parameter the trajectory of the application head, an origin point P0 of the head is defined that corresponds, for example, to the middle of the generatrix line G of the roller in contact with the surface. The application head is moved until the point of origin P0 is substantially on the first junction line.

Figure 5:
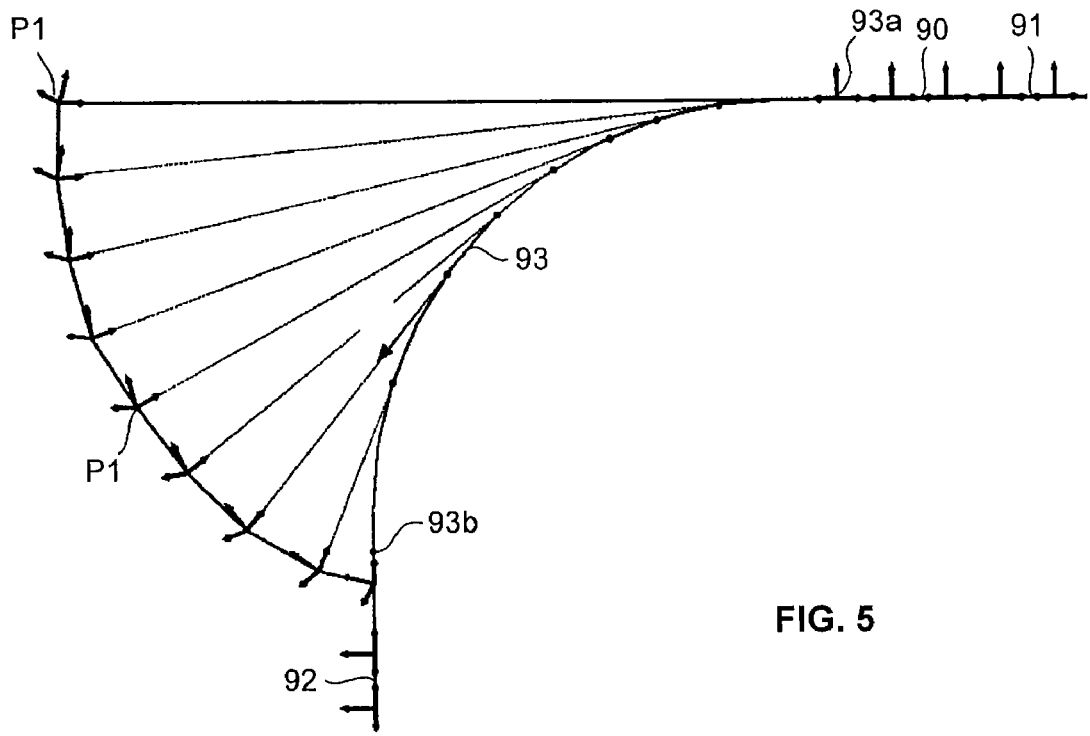
FIG. 5 is an enlarged schematic side view of the application surface of FIG. 3, whereon is illustrated the trajectory of a point of the roller in vertical projection during the movement of the head for applying the band of fibers on the rounded surface.

With reference to FIGS. 5 and 6, the application head is moved in the same direction F1, tangentially to the first surface 91, over a distance L1, such that the edge of the external fiber 71 of the band applied on the first surface comes up to the first junction line. For a width of a band equal to 2d, said distance L1 is equal to d/tan α1.

The movement of the head in direction F1, tangentially to the first surface, is continued over a distance L2, this distance L2 being at least equal to the length of fiber necessary for its winding on the rounded surface between the two junction lines, added by the distance separating the generatrix line G of the roller from the compacting wedge.

Figure 4C:
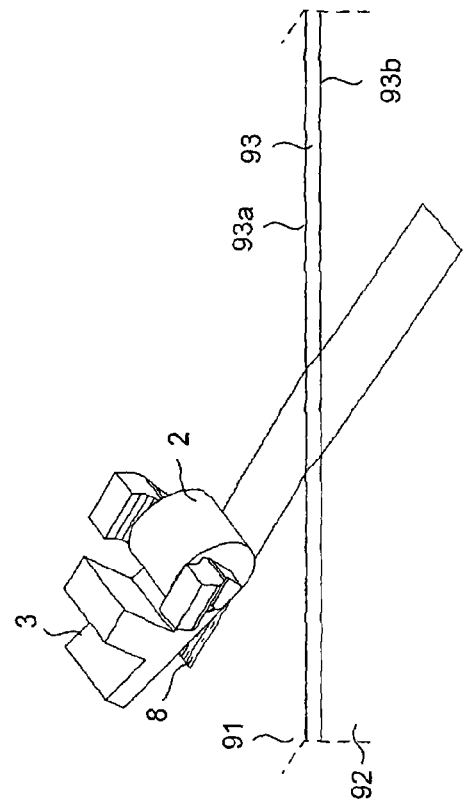

The application head is then tilted backwards to press the compacting wedge 3 against the first surface, the contact surface 32 of the wedge against the band of fibers applied on the first surface, such as illustrated in FIG. 4C. Rocking the head backwards to push the compacting wedge is carried out at the end of or during moving the head over distances L1 and L2 or over distance L2, such as at the end of the movement to prevent any sliding of the wedge with respect to the fibers.

Figure 4D:
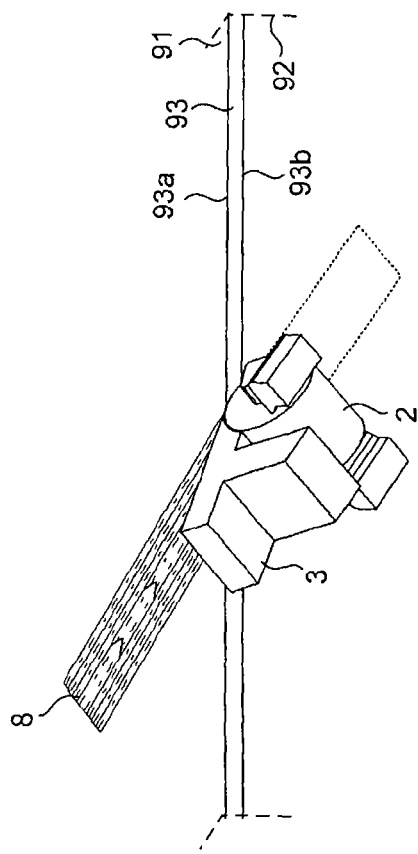

The head then pivots around the rounded surface 93, such as illustrated in FIG. 4D according to a trajectory that makes it possible to maintain the compacting wedge in contact with the mold substantially by at least one contact line, while maintaining a relatively null speed between the wedge and the mold. The pivoting is carried out until the roller abuts on the second surface 92 along a contact line, beyond the second junction line. FIG. 5 illustrates the trajectory in vertical projection of point P1 of the contact generatrix line G of the roller, the point P1 being the point of the generatrix line placed at the edge of the external fiber 71 of the band. Each point of the roller describes an involute curve corresponding to the winding of a fiber of length L2 around the arc described by the rounded surface between two junction lines. At the end of the pivoting, the point P1 arrives on the second surface 92, such that the front edge 34 of the compacting wedge is placed beyond the second junction line, with the end of this front edge 34 located on the right of point P1 possibly substantially placed along the second junction line 93b.

Figure 4E:
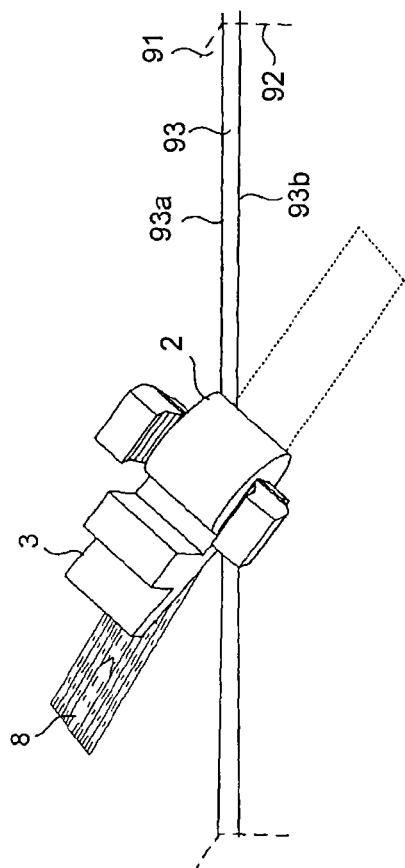
Figure 4F:
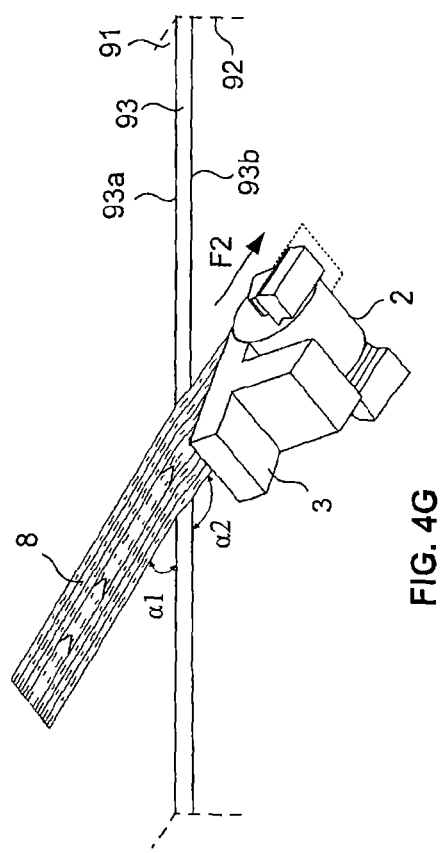
Figure 4G:
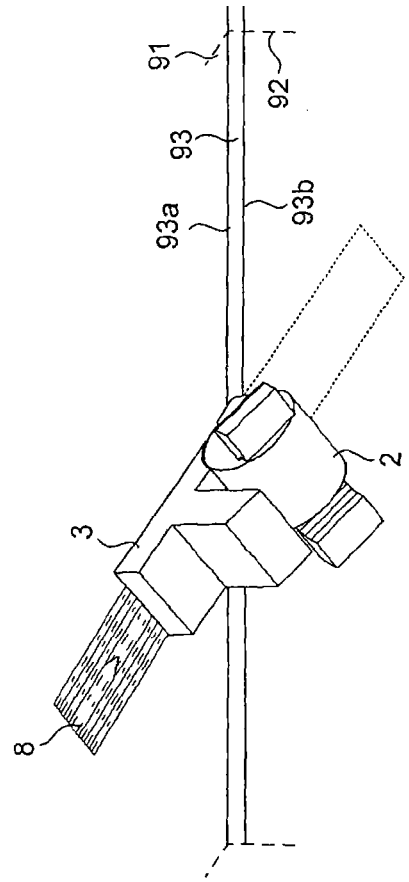

Once the pivoting of the head around the rounded surface has ended, such as illustrated in FIG. 4E, the compacting roller is pressed along a contact line, the head tilts forward to lift the compacting wedge, so that it is no longer in contact with the mold, such as illustrated in FIG. 4F.

Once the compacting wedge is no longer in contact, the head resumes its drape forming with only the compacting roller in contact, in direction F2 making an angle α2 with respect to the second junction line, this angle α2 being substantially equal to 180°-α1.

In the case of a roller and a compacting wedge in deformable material, their deformation capacity allows for certain deviations to the L2 movement, and thus, certain deviations on the positioning of the contact generatrix line G before and after the pivoting, while ensuring a compacting of all the fibers on the rounded surface.

In one embodiment, the movement of the head over distance L2 allows for the unwinding of the fibers and the shifting of the wedge with respect to the first junction line over a sufficient length to make the compacting of the band possible by the wedge on the entire rounded surface during the pivoting operation.

Alternatively, the application of the band on the rounded surface may be carried out in several movement and pivoting operations, particularly when the winding arc of each fiber between the two junction lines is large and/or when the wedge exhibits a length less than the winding arc. In this case, the head is tangentially moved to the first surface over a distance L1, as before, then over a distance L'2 less than the winding arc. After rocking the head for the pressing of the wedge, the head is pivoted until it is put in contact with the roller against the rounded surface. The head is then tangentially moved at the contact point over a distance L"2 possibly equal to distance L'2. During this movement, the wedge may be maintained against the rounded surface, or, in one embodiment, the head is rocked forward to move it apart from the rounded surface and thus prevent any sliding. If the wedge has been moved apart, at the end of the movement over the L2 distance, the wedge is brought against the rounded surface by a contact line by rocking the head backwards. The head is then pivoted, such as described previously. If the roller arrives in contact with the second surface at the end of this pivoting, the head is then rocked backwards to achieve the typical application of the band on the second surface. Otherwise, the moving and pivoting operations are repeated until the roller contacts the second surface.

The method according to embodiments of the invention may of course be adapted to various application surfaces comprising two surfaces forming a edge or connected by a rounded surface, particularly two substantially parallel surfaces connected by an arc-shaped rounded surface on 180° or more than 180°. Furthermore, the aforementioned tangential movement and pivoting operations may be continuously sequenced for example for the draping on a cylinder of small diameter.

In the simple case of two surfaces connected by a sharp edge or by a rounded surface whereof the radius of curvature is sufficiently low to make the compacting of the rounded surface by elastic deformation of the compacting wedge possible, the head is moved over a distance at least equal to the aforementioned distance L1, preferably added to the distance separating the generatrix line from the front edge of the compacting wedge in an embodiment, the head is then rocked backwards to press the wedge, then pivoted to press the roller against the second surface.

Figure 7A:
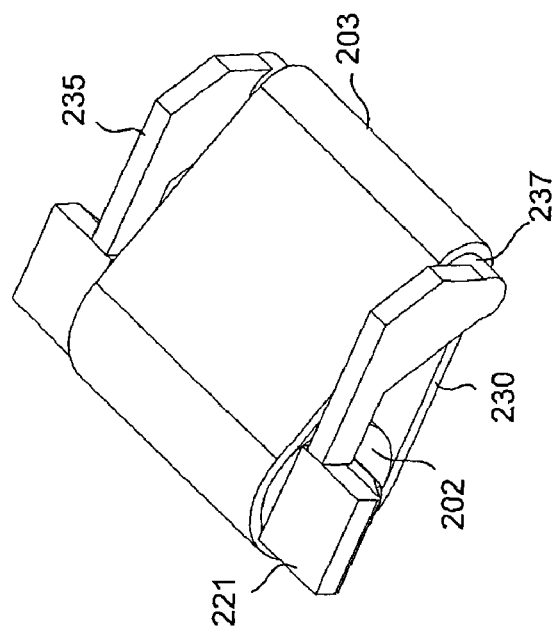
FIGS. 7A and 7B are respectively a perspective view and a side view of the compacting system of an application head according to a second embodiment of the invention; and, FIGS. 8A and 8B are respectively a perspective view and a side view of the compacting system of an application head according to a third embodiment of the invention.
Figure 7B:
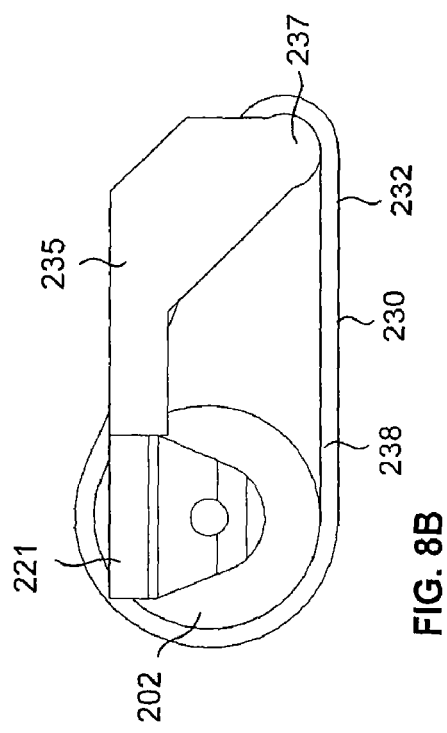

FIGS. 7A and 7B illustrate a second embodiment of a compacting system mountable on the support structure of a head. The compacting system comprises a compacting roller 102, as before, and a compacting member 103 comprising an endless band 130, or belt, mounted on an upstream return roller 136 and a downstream return roller 137. Both return rollers are rotatably mounted on the support structure of the head, downstream from the compacting roller, parallely to the axis of the compacting roller, the lower strand 138 of the endless band constituting said contact surface 132 whereby the compacting member is pressed against the mold.

This contact surface 132 formed by an endless belt allows for a possible sliding of the contact surface with respect to the mold during the pivoting operation, and allows for the rocking of the head to press this contact surface before the pivoting operation, without sliding with respect to the surface, the mold for example, when the origin point P0 is on the first junction line and/or during the moving of the head over a distance L1 and/or over aforementioned distances L2, L'2 and L"2.

Advantageously, the return rollers 136, 137 are mounted via a system of lateral arms 135 on the lateral supports 121 of the compacting roller, whereby the compacting system is mounted movable on the support structure of the head.

Figure 8A:
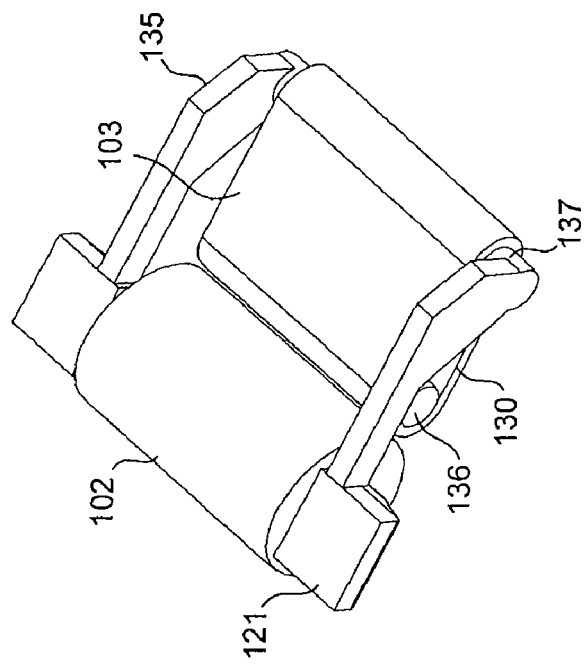
Figure 8B:
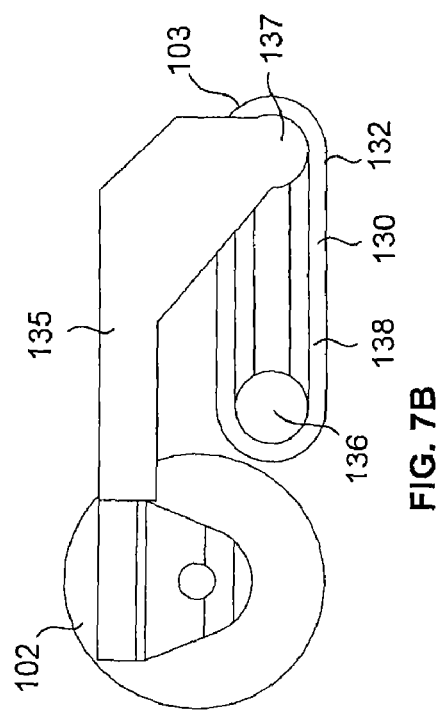

FIGS. 8A and 8B illustrate a third embodiment of the compacting system wherein the compacting member 203 comprises an endless band 230 mounted on the compacting roller 202 and a downstream return roller 237. The latter is mounted downstream and parallely to the compacting roller. The endless band thus constitutes the contact surface of the compacting roller and its lower strand 238 constitutes said contact surface 232 of the compacting member. The downstream return roller is mounted via lateral arms 235 to the lateral supports 221 of the compacting roller.

The aforementioned endless bands 130 and 230 are advantageously constituted of an elastomeric material, externally coated by an anti adhesive film, for example a Teflon-type film.

Although the invention has been described in connection to various particular embodiments, it is to be understood that it is in no way limited thereto and that it includes all the technical equivalents of the means described as well as their combinations should these fall within the scope of the invention.

The invention claimed is:

1. A method for applying a band formed of several fibers on an application surface comprising a first substantially planar surface and a second substantially planar surface connected by an edge or a rounded surface, or on a convex application surface, application of the band carried out by a fiber application head comprising a compacting system including a compacting roller, the method comprising:
   applying the compacting roller against the application surface and moving the fiber application head to apply a band of fibers on the application surface;
   applying, against the band of fibers applied on the application surface, a compacting member of the compacting system, arranged downstream from the compacting roller with respect to a progress direction of the fiber application head, the compacting member being substantially in contact with all the fibers of the band by at least one contact line; and
   pivoting the fiber application head around the edge, around the rounded surface or around the convex application surface, such that the compacting member remains in contact with the band to compact the band by at least one contact line, substantially without sliding between the compacting member and the application surface.

2. The method according to claim 1, wherein the application surface comprises a first substantially planar surface and a second substantially planar surface connected by an edge, and wherein the method comprises:
   applying the compacting roller against the first surface by at least one contact line, and moving the fiber application head to apply a band of fibers on the first surface, in a first direction forming an angle α1 with the edge;
   moving the fiber application head in the first direction, tangentially to the first surface, to bring the compacting roller substantially beyond the edge, and applying the compacting member against the band applied on the first surface;
   pivoting the fiber application head around the edge, such that the compacting member remains in contact with the band by at least one contact line, the pivoting carried out until the compacting roller contacts the second surface by at least one contact line substantially corresponding to a width of the band; and
   separating the compacting member from the application surface so that the compacting member is no longer in contact with the application surface, and moving the fiber application head to apply the band on the second surface, in a second direction forming an angle α2 with the edge, substantially equal to 180-α1.

3. The method according to claim 2, wherein the angle α1 is between 10° and 80°.

4. The method according to claim 1, wherein the application surface comprises a first substantially planar surface and a second substantially planar surface connected by a rounded surface, the method comprising
   applying the compacting roller against the first surface by at least one contact line and moving the fiber application head to apply a band of fibers on the first surface, in a first direction forming an angle al with a first junction line between the first surface and the rounded surface;
   moving the fiber application head in the first direction, tangentially to the first surface, to bring the compacting roller beyond the first junction line, and applying the compacting member against the band applied on the first surface;
   pivoting the fiber application head around the rounded surface, such that the member remains in contact with the band by at least one contact line, until the compacting roller contacts the second surface by at least one contact line; and separating the compacting member from the application surface so that the compacting member is no longer in contact with the application surface, and moving the fiber application head contacting the second surface by the compacting roller by at least one contact line to apply the band on the second surface, in a direction forming an angle α2, substantially equal to 180-α1, with the second junction line between the rounded surface and the second surface.

5. The method according to claim 4, wherein after applying the compacting member against the band applied on the first surface, the method comprises:

pivoting the fiber application head around the rounded surface until contacting the compacting roller against the application surface; and if the compacting roller is in contact on at least one contact point with the rounded surface at the end of the pivoting, moving the fiber application head tangentially to the rounded surface to the contact point, in a direction forming an angle α1 with a generatrix line of the rounded surface passing by the contact point, then pivoting the fiber application head around the rounded surface, this moving and pivoting being repeated until contacting the compacting roller against the second surface by at least one contact line.

6. The method according to claim 4, wherein after applying the compacting member against the band applied on the first surface, the method comprises:

pivoting the fiber application head around the rounded surface; and before the compacting roller comes into contact on at least one contact point with the rounded surface, moving the fiber application head tangentially to the rounded surface to the contact point, in a direction forming an angle α1 with a generatrix line of the rounded surface passing by the contact point, then pivoting the fiber application head around the rounded surface, this moving and pivoting being repeated until contacting the compacting roller against the second surface by at least one contact line.

7. The method according to claim 1, wherein the application surface is convex, and the method comprises:

applying the compacting roller against the convex application surface by at least one contact point;

moving the fiber application head tangentially to the convex application surface to the contact point in a direction forming an angle α1 with a generatrix line of the convex surface passing by the contact point to bring the compacting roller beyond the generatrix line; and pivoting the fiber application head, pressed against the convex application surface by its compacting member, around the convex application surface, the pivoting being carried out such that the member remains in contact with the band by at least one contact line.

8. The method according to claim 7, wherein after moving the fiber application head tangentially to the convex application surface to the contact point, the method comprises:

pivoting around the convex application surface, the fiber application head pressed against the convex application surface by its compacting member, until contacting the compacting roller against the convex application surface; and repeating the moving and pivoting one or more times.

9. The method according to claim 7, wherein after moving the fiber application head tangentially to the convex application surface to the contact point, the method comprises:

pivoting around the convex application surface, the fiber application head pressed against the convex application surface by its compacting member; and before contacting the compacting roller against the convex application surface, repeating the moving and pivoting one or more times.

* * * * *

UNITED STATES PATENT AND TRADEMARK OFFICE
CERTIFICATE OF CORRECTION

PATENT NO. : 8,052,819 B2
APPLICATION NO. : 12/434253
DATED : November 8, 2011
INVENTOR(S) : Munaux et al.

Page 1 of 1

It is certified that error appears in the above-identified patent and that said Letters Patent is hereby corrected as shown below:

Title Page, Item (73) Assignee: delete "Lyons" and insert --Lyon--

Col. 3, line 54, delete "a1" and insert --$\alpha$1--

Col. 10, line 59, delete "a1" and insert --$\alpha$1--

Signed and Sealed this
Ninth Day of April, 2013

Teresa Stanek Rea
*Acting Director of the United States Patent and Trademark Office*